United States Patent
Wu (10) Patent No.: US 10,837,402 B2
(45) Date of Patent: Nov. 17, 2020

(54) THRUST VECTOR NOZZLE

(71) Applicant: Guanhao Wu, Jersey City, NJ (US)

(72) Inventor: Guanhao Wu, Jersey City, NJ (US)

( * ) Notice: Subject to any disclaimer, the term of this patent is extended or adjusted under 35 U.S.C. 154(b) by 0 days.

(21) Appl. No.: 16/738,124

(22) Filed: Jan. 9, 2020

(65) Prior Publication Data
US 2020/0141354 A1    May 7, 2020

(51) Int. Cl.
*F02K 1/00* (2006.01)
*F02K 9/84* (2006.01)
*B64C 15/02* (2006.01)

(52) U.S. Cl.
CPC ............. *F02K 1/004* (2013.01); *B64C 15/02* (2013.01); *F02K 9/84* (2013.01); *F02K 1/008* (2013.01)

(58) Field of Classification Search
CPC . F02K 1/008; F02K 1/004; F02K 9/84; F02K 9/90
See application file for complete search history.

(56) References Cited

U.S. PATENT DOCUMENTS

| 3,271,948 A | 9/1966 | Fuller |
| 3,438,581 A | 4/1969 | Smith |
| 3,455,111 A | 7/1969 | Allcock |
| 3,704,828 A | 12/1972 | Studer et al. |
| 4,363,445 A | 12/1982 | Bouiller et al. |
| 4,508,270 A * | 4/1985 | Joubert .................. F02K 1/008 239/265.35 |
| 4,714,197 A | 12/1987 | Thayer et al. |
| 4,984,741 A * | 1/1991 | Nightingale ............ F02K 1/008 239/265.17 |
| 4,993,638 A | 2/1991 | Lardellier |
| 5,082,182 A | 1/1992 | Bruchez et al. |
| 5,687,907 A | 11/1997 | Holden |
| 5,740,988 A | 4/1998 | Ausdenmoore |

(Continued)

FOREIGN PATENT DOCUMENTS

EP    0286572 A2    10/1988

OTHER PUBLICATIONS

YouTube. "Building the thrust vector nozzle for your micro concept jet.http://foamconceptjets.yolasite.com." youtube.com/watch?v=NK4chv4S7V0 [date accessed Feb. 4, 2020].

*Primary Examiner* — Andrew H Nguyen
(74) *Attorney, Agent, or Firm* — Michael J. Feigin, Esq.; Feigin and Fridman LLC (57) ABSTRACT

A thrust vectoring exhaust nozzle is disclosed. The nozzle includes an inner nozzle for changing a first degree-of-freedom of exhaust gas, an outer nozzle for changing a second degree-of-freedom of exhaust gas, a mounting bracket, a first linear actuator, a second linear actuator, a first double universal joint, and a second double universal joint. The inner nozzle is coupled to the outer nozzle. The inner nozzle is coupled to the mounting bracket. The outer nozzle is coupled to the first and second joint. When the nozzle is mounted, the inner nozzle, the outer nozzle, and the exhaust are coaxially aligned in neutral position. Actuation of the first and second linear actuators drives the first and second double universal joints independently to each other. The independent motion of the first and second double universal joints rotates the inner and outer nozzles simultaneously about the exhaust in a horizontal direction and vertical direction enabling thrust vectoring.

19 Claims, 5 Drawing Sheets

SECTION A-A (56) References Cited

U.S. PATENT DOCUMENTS

| | | | |
|---|---|---|---|
| 6,199,772 B1 * | 3/2001 | Renggli | F02K 1/008 |
| | | | 239/265.19 |
| 6,212,877 B1 * | 4/2001 | Renggli | F02K 1/008 |
| | | | 239/265.35 |
| 6,259,976 B1 | 7/2001 | Lemelson et al. | |
| 6,546,716 B2 | 4/2003 | Lair | |
| 6,622,472 B2 | 9/2003 | Plumpe | |
| 6,857,600 B1 | 2/2005 | Walker et al. | |
| 7,481,038 B2 | 1/2009 | Blozy et al. | |
| 8,240,125 B2 | 8/2012 | Kawai | |
| 8,689,674 B2 | 4/2014 | Duke et al. | |
| 10,077,108 B2 | 9/2018 | Lauder | |
| 2005/0016158 A1 * | 1/2005 | Berdoyes | F02K 9/84 |
| | | | 60/232 |

* cited by examiner

SECTION L-L

US 10,837,402 B2

THRUST VECTOR NOZZLE

FIELD OF THE DISCLOSED TECHNOLOGY

The disclosed technology relates to a thrust vectoring exhaust nozzle. More specifically, the disclosed technology relates to an exhaust nozzle including asynchronously actuating mechanisms that rotate the nozzle in a horizontal and vertical direction simultaneously about the exhaust enabling thrust vectoring.

BACKGROUND OF THE DISCLOSED TECHNOLOGY

Many thrust vectoring exhaust nozzle designs employ flaps or panes with a ring to deflect or diverge exhaust emanating from the aircraft. The flaps and panes enable the nozzle to create a variable outlet cross-sectional area, as well as a variable exit direction to provide different exhaust exit methods, enabling multidirectional control, or vectoring, of the aircraft when used on a jet-powered vehicle. The need for a variable outlet area to accommodate afterburners increases the complexity of the nozzle design. In applications where the variable area is not necessary, and the thrust vectoring is desireable, the above-mentioned nozzle design becomes excessive.

Accordingly, there is a need for an alternative nozzle design that can achieve two-degree-of-freedom thrust vectoring with minimal actuators and components.

SUMMARY OF THE DISCLOSED TECHNOLOGY

Disclosed herein is a thrust vectoring exhaust nozzle apparatus including an inner nozzle to change a first degree-of-freedom of exhaust gas emanating from an exhaust of a gas turbine and an outer nozzle to change a second degree-of-freedom of exhaust gas emanating from the exhaust of the gas turbine, wherein the inner nozzle is disposed within the outer nozzle, and the inner nozzle, the outer nozzle, and the exhaust nozzle of the gas turbine are coaxially aligned relative to one another in their neutral position.

In embodiments, the thrust vectoring exhaust nozzle includes a mounting bracket removably attachable to the gas turbine, a first linear actuator coupled to the mounting bracket, a second linear actuator coupled to the mounting bracket, a first double universal joint coupled to the first linear actuator, and a second double universal joint coupled to the second linear actuator. The outer nozzle is coupled to the first double universal joint and the second double universal joint. The inner nozzle is coupled to the mounting bracket. The mounting bracket positions the inner nozzle around the exhaust of the gas turbine when mounted. Actuation of the first linear actuator and the second linear actuator drives the first double universal joint and the second double universal joint linearly at their proximal end and asynchronously relative to each other. The linear asynchronous motion of the first double universal joint and the second double universal joint rotates the nozzle about the exhaust in a horizontal direction and vertical direction simultaneously.

In some embodiments, the thrust vectoring exhaust nozzle apparatus includes a nozzle bracket connecting the inner nozzle to the outer nozzle enabling movement of the outer nozzle relative to the inner nozzle.

In embodiments, the inner nozzle is swivelly coupled to the mounting bracket enabling movement of the inner nozzle relative to the mounting bracket and the outer nozzle includes a first arm removably affixed to the first double universal joint and a second arm removably affixed to the second double universal joint.

In certain embodiments, the distance between the first arm and the second arm of the outer nozzle corresponds to the distance between the first double universal joint and the second double universal joint.

In some embodiments, the inner nozzle includes a conically shaped body including a first end and a second end, wherein the body includes a bore extending longitudinally through the body that tapers in diameter from the first end to the second end.

In embodiments the outer nozzle includes a conically shaped body including a first end and a second end, wherein the body of the outer nozzle includes a bore extending longitudinally through the body that tapers in diameter from the first end to the second end.

In some embodiments, the mounting bracket includes an inner mount removably attachable to a first side of the gas turbine, an outer mount removably attachable to a second side of the gas turbine, a mounting strap removably attachable to the gas turbine, wherein the inner mount and the outer mount are removably attachable to each other about the gas turbine via the mounting strap.

In certain embodiments, the mounting bracket includes a reinforcement plate removably attachable to the first side of the gas turbine to support the inner mount when mounted on the gas turbine.

In embodiments, the first linear actuator and the second linear actuator each include a body having an actuating mechanism coupled to a shaft, wherein the actuating mechanism drives the shaft linearly back and forth in cyclic fashion.

In some embodiments, the first double universal joint includes a first end removably affixed to a distal end of the shaft of the first linear actuator and the second double universal joint includes a first end removably affixed to a distal end of the shaft of the second linear actuator.

In embodiments, the outer mount includes an elongated body including a first end, a second end, a first side, and a second side, a pair of arcuate arms including an arch corresponding to the curvature of the body of the gas turbine to fit flush around the gas turbine, a linear actuator mount including a first aperture for receiving the shaft of the first linear actuator therethrough and a second aperture for receiving the shaft of the second linear actuator therethrough, and a recess to receive and retain a ball bearing therein.

In some embodiments, the pair of arcuate arms extend outwardly from the first side of the elongated body and include an aperture for fastening the elongated body to the gas turbine. The linear actuator mount includes a plate including the first aperture and the second aperture, wherein the plate extends perpendicularly outwardly from the first end and second side of the linear actuator mount. The recess is disposed on the second side of the elongated body.

In embodiments, an inner mount includes an elongated body including a first end, a second end, a first side, and a second side, a pair of arcuate arms including an arch corresponding to the curvature of the body of the gas turbine to fit flush around the gas turbine, and a recess to receive and retain a ball bearing therein.

In some embodiments, the pair of arcuate arms are disposed on the first end of the inner mount and extend outwardly from the first side of the elongated body of the inner mount and include an aperture for fastening the elongated body of the inner mount to the gas turbine. The recess is disposed on the first side of the elongated body.

In embodiments, the inner nozzle includes a first shaft disposed adjacent a perimeter edge of the first end, the first shaft extending outwardly relative to the body of the inner nozzle, a second shaft disposed adjacent a perimeter edge of the first end of the nozzle, the second shaft extending outwardly relative to the body of the inner nozzle. The first shaft and the second shaft are disposed oppositely relative to each other on the first end of the inner nozzle. The recess of the outer mount removably receives the first shaft via a ball bearing. The recess of the inner mount removably receives the second shaft via a ball bearing. The ball bearings enable a one DOF (degree of freedom—defined as "ability to move in a particular plane" or as known in the art), and/or rotational movement of the inner nozzle relative to the exhaust of the gas turbine.

In embodiments, the outer nozzle includes a first shaft disposed on the first arm, the first shaft extending outwardly relative to the first arm of the outer nozzle, a second shaft disposed on the second arm, the second shaft extending outwardly relative to the second arm of the outer nozzle. The first double universal joint comprises an aperture disposed at a distal end thereof that removably receives the first shaft. The second double universal joint comprises an aperture disposed at a distal end thereof that removably receives the second shaft. The distance between a center of the first shaft and a center of the second shaft corresponds to a distance between the center of the aperture of the first double universal joint and the center of the aperture of the second double universal joint.

In some embodiments, the first end of the outer nozzle comprises a perimeter edge including a first recess corresponding to the first shaft of the inner nozzle and a second recess corresponding to the second shaft of the inner nozzle, wherein the first recess and second recess provide clearance for rotational movement of the inner nozzle relative to the outer nozzle.

In embodiments, the outer nozzle includes a third shaft disposed adjacent the perimeter edge of the first end, the third shaft extending outwardly relative to the body of the outer nozzle and a fourth shaft disposed adjacent a perimeter edge of the first end of the nozzle, the fourth shaft extending outwardly relative to the body of the outer nozzle. The third shaft and the fourth shaft are disposed oppositely relative to each other on the first end of the outer nozzle.

In some embodiments, the nozzle bracket includes a first recess that removably receives the third shaft of the outer nozzle via a ball bearing and a second recess that removably receives the fourth shaft of the outer nozzle via a ball bearing, wherein the ball bearings enable one DOF, rotational motion of outer nozzle relative to (e.g. perpendicular to) the inner nozzle.

For purposes of this disclosure, the following definitions are used. "Actuator" is defined as a "mechanical, electrical, or electromechanical device that causes an article, device, machine, apparatus, or system to operate." "Actuate" is defined as "to cause a machine, device, apparatus, or process to operate." "Thrust" is defined as "the propulsive force of an engine." "Vector" is defined as "a course or direction, as of an aircraft or vehicle." "Vectoring" is defined as the "act of controlling or manipulating a course or direction." "Thrust vectoring" is defined as "the ability of an aircraft, rocket, or other vehicle or engine to manipulate the direction of the thrust from its engine(s) or motor(s) to control the linear and angular states (x, y, and z axis) of the vehicle." "Exhaust" is defined as "the duct, pipe, area, or device through which fluids are expelled out of a system, aircraft, vehicle, or engine." "Outlet" is defined as "the portion of an orifice where the flow exits, such as the outlet of a nozzle." "Variable geometry" is defined as "a device, or system, which includes a geometry that varies in that the device, or system, have changing geometric variables." "Variable direction outlet" is defined as "an outlet having a variable direction." "Nozzle" is defined as "a cylindrical or round device or apparatus at the end of an exhaust, pipe, hose, or tube used to control a jet of a fluid, such as gas." "Gas turbine" also known as "a combustion turbine," is a type of continuous combustion, internal combustion engine." "Degree-of-freedom" is defined as "any of a limited number of ways in which a body may move or in which a dynamic system may change." "Universal joint" is defined as "a joint or coupling connecting rigid rods whose axes are inclined to each other and consists of a pair of hinges located close together, oriented at 90° to each other, connected by a cross shaft. "Double universal joint" is defined as "a joint consisting of two universal joints mounted back to back with a center yoke interconnecting the two universal joints." "Asynchronous" is defined as "not occurring at the same time." "Simultaneous" is defined as "occurring at the same time." "Cyclic" is defined as occurring in regular repeated cycles." "Swivelly" is defined as "a coupling between two parts enabling one to revolve without turning the other." "Coaxial" is defined as "having a common axis."

Any device or step to a method described in this disclosure can comprise or consist of that which it is a part of, or the parts which make up the device or step. The term "and/or" is inclusive of the items which it joins linguistically and each item by itself. "Substantially" is defined as at least 95% of the term being described and/or "within a tolerance level known in the art and/or within 5% thereof. Any device or aspect of a device or method described herein can be read as "comprising" or "consisting" thereof.

DETAILED DESCRIPTION OF EMBODIMENTS OF THE DISCLOSED TECHNOLOGY

The present disclosed technology provides an exhaust nozzle apparatus including asynchronously actuating mechanism that rotate the nozzle in a horizontal and vertical direction simultaneously about an exhaust, thereby creating a variable direction outlet having a variable geometry for providing different exhaust exit directions enabling multi-directional control, or vectoring, when thrusting or propelling.

Figure 1A:
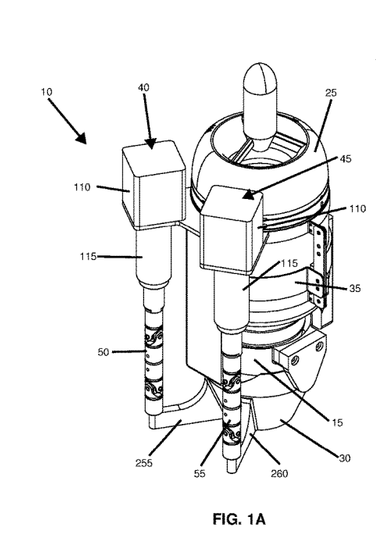
FIG. 1A shows a perspective view of the thrust vectoring exhaust nozzle mounted onto a gas turbine according to one embodiment of the present disclosed technology.
Figure 1B:
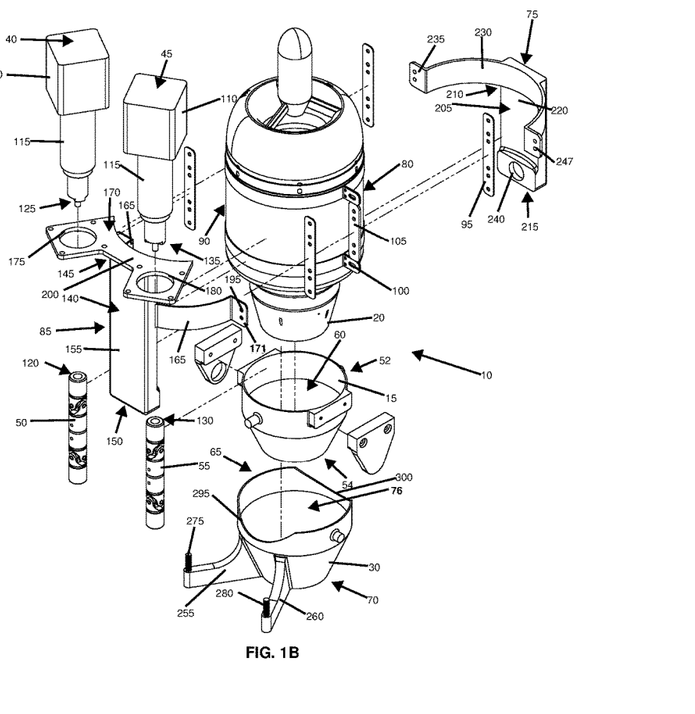
FIG. 1B shows an exploded view of the thrust vectoring exhaust nozzle of FIG. 1A.

Referring now to FIGS. 1A and 1B simultaneously, FIG. 1A shows a perspective view of the thrust vectoring exhaust nozzle mounted onto a gas turbine according to one embodiment of the present disclosed technology. FIG. 1B shows an exploded view of the thrust vectoring exhaust nozzle of FIG. 1A. The present disclosed technology comprises a thrust vectoring exhaust nozzle apparatus 10 comprising an inner nozzle 15 for changing a first degree-of-freedom of exhaust gas emanating from an exhaust 20 of a gas turbine 25, an outer nozzle 30 for changing a second degree-of-freedom of exhaust gas emanating from the exhaust 20 of the gas turbine 25, a mounting bracket 35 removably attachable to the gas turbine 25, a first linear actuator 40 coupled to the mounting bracket 35, a second linear actuator 45 coupled to the mounting bracket 35, a first mechanism or (universal) joint 50 coupled to the first linear actuator 40, and a second mechanism or joint 55 coupled to the second linear actuator 45.

In embodiments, the inner nozzle 15 includes a conically shaped body including a first end 52 and a second end 54, wherein the body includes a bore 60 extending longitudinally through the body that tapers in diameter from the first end 52 to the second end 54. The outer nozzle 30 includes a conically shaped body including a first end 65 and a second end 70, wherein the body of the outer nozzle 30 includes a bore 76 extending longitudinally through the body that tapers in diameter from the first end 65 to the second end 70.

In embodiments, the mounting bracket 35 includes an inner mount 75 that is removably attachable to a first side 80 of the gas turbine 25, an outer mount 85 that is removably attachable to a second side 90 of the gas turbine 25, a mounting strap 95 that is removably attachable to a frame 100 of the gas turbine 25. In some embodiments, the mounting bracket 35 includes a reinforcement plate 105 removably attachable to the first side 80 of the gas turbine 25 to support the inner mount 75 when mounted on the gas turbine 25. The inner mount 75 and the outer mount 85 are removably attachable to each other about the gas turbine 25 via the mounting strap 95, as shown in FIG. 1A.

In embodiments, the first linear actuator 40 and the second linear actuator 45 each define a body having an actuating mechanism 110 coupled to a shaft 115. The actuating mechanism 110 drives the shaft 115 linearly back and forth in, some embodiments, a cyclic fashion.

In some embodiments, the first mechanism 50 comprises a first double universal joint including a first end 120 removably affixed to a distal end 125 of the shaft 115 of the first linear actuator 40 and the second mechanism 55 comprises a second double universal joint including a first end 130 removably affixed to a distal end 135 of the shaft 115 of the second linear actuator 45.

In embodiments, the outer mount 85 includes a first elongated body 140 including a first end 145, a second end 150, a first side 155, and a second side (not shown in FIGS. 1A and 1B), a pair of first arcuate arms 165 including an arch corresponding to the curvature of the body of the gas turbine 25 to fit flush around the gas turbine 25, a linear actuator mount 170 including a first aperture 175 for receiving the shaft 115 of the first linear actuator 40 therethrough and a second aperture 180 for receiving the shaft 115 of the second linear actuator 45 therethrough, and a first recess 185 (not shown in FIGS. 1A and 1B) to receive and retain a first ball bearing 190 (see FIG. 2B) therein. In some embodiments, the pair of arcuate arms 165 extend outwardly from the second side 160 of the elongated body 140 and include an aperture 195 for fastening the elongated body 140 to the gas turbine 25. In one embodiment, the pair of arcuate arms 165 extend perpendicularly outwardly relative to the first side 155 of the elongated body 140. In another embodiment, the pair of arcuate arms 165 each include a flange 171 extending perpendicularly outwardly relative to the corresponding arcuate arm that includes the aperture 195. The linear actuator mount 170 includes a plate 200 including the first aperture 175 and the second aperture 180. The plate 200 is disposed on the first end 145 of the elongated body 140 and extends outwardly from the second side 160 of the linear elongated body 140. In one embodiment, the plate 200 extends perpendicularly outwardly relative to the second side 160 of the linear elongated body 140. The recess 185 is disposed on the second side 160 of the elongated body 140 adjacent the second end 150 of the elongated body 140.

In embodiments, the inner mount 75 includes a second elongated body 205 including a first end 210, a second end 215, a first side 220, and a second side 225 (not shown in FIGS. 1A and 1B), a second arcuate arm 230 including an arch corresponding to the curvature of the body of the gas turbine 25 to fit flush around the gas turbine 25, and a second recess 240 to receive and retain a second ball bearing 245 (not shown in FIGS. 1A and 1B) therein. In some embodiments, the arcuate arm 230 is disposed on the first end 210 of the elongated body and extends outwardly from the first side 220 of the elongated body 205 and includes an aperture 247 for fastening the elongated body 205 to the gas turbine 25. In one embodiment, the arcuate arm 230 extends perpendicularly outwardly relative to the first side 220 of the elongated body 205. In another embodiment, the arcuate arm includes a flange 235 at a either end that includes the aperture 247. The flange 235 extends perpendicularly outwardly relative to the arcuate arm 230. The flange 235 corresponds to the flange 170 of the pair of arcuate arms 165 of the outer mount 85 such that the outer mount 85 and the inner mount 75 may fasten to one another around the gas turbine 25 via the flanges 170, 235. The recess 240 is disposed on the first side 220 of the elongated body 205 adjacent the second end 25 of the elongated body 205.

Figures 2A, 2B:
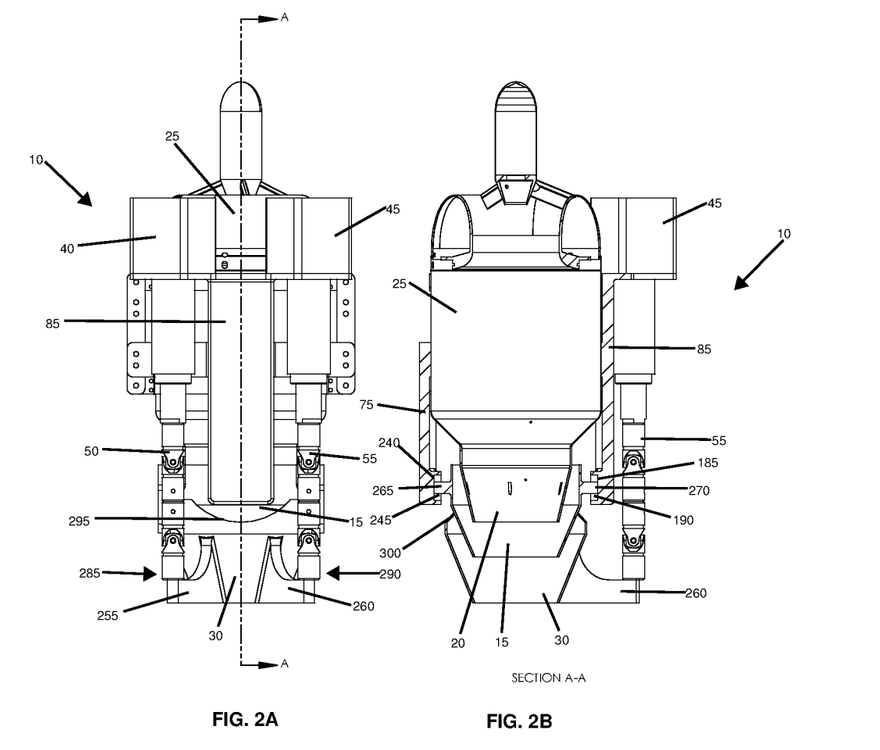
FIG. 2A shows a front view of the thrust vectoring exhaust nozzle mounted onto a gas turbine according to one embodiment of the present disclosed technology.
FIG. 2B shows a cross-sectional view of FIG. 2A along line A-A.
Figure 3A:
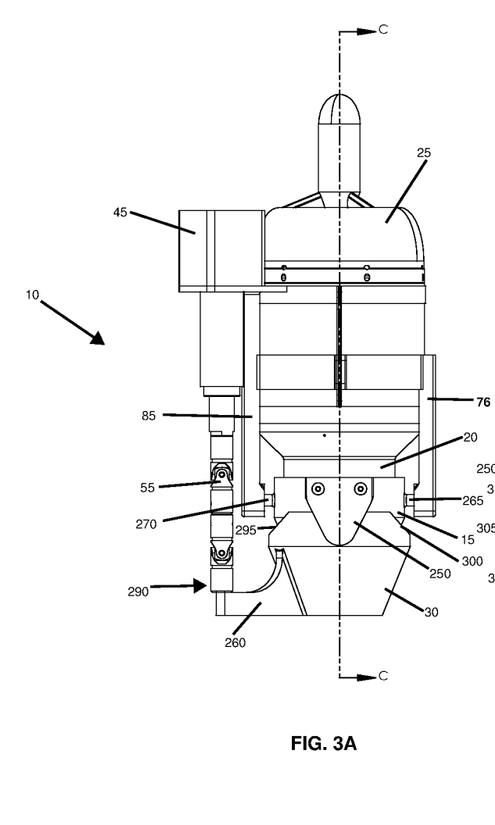
FIG. 3A shows a left side view of the thrust vectoring exhaust nozzle mounted onto a gas turbine according to one embodiment of the present disclosed technology.
Figure 3B:
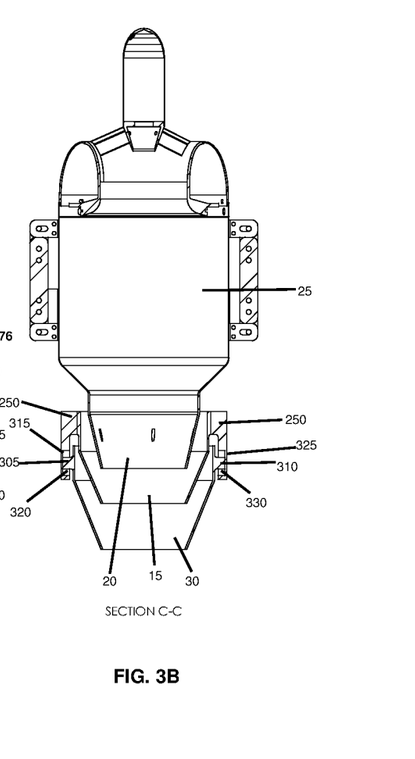
FIG. 3B shows a cross-sectional view of FIG. 3A along line C-C.

Referring now to FIGS. 2A-3B, simultaneously, FIG. 2A shows a front view of the thrust vectoring exhaust nozzle mounted onto a gas turbine according to one embodiment of the present disclosed technology. FIG. 2B shows a cross-sectional view of FIG. 2A along line A-A. FIG. 3A shows a left side view of the thrust vectoring exhaust nozzle mounted onto a gas turbine according to one embodiment of the present disclosed technology. FIG. 3B shows a cross-sectional view of FIG. 3A along line C-C. In embodiments of the present disclosed technology, when the thrust vectoring nozzle apparatus 10 is mounted onto the gas turbine 25 and is in its neutral position, the inner nozzle 15 is disposed within the outer nozzle 30, and the inner nozzle 15, the outer nozzle 30, and the exhaust 20 of the gas turbine 25 are coaxially aligned relative to one another.

In embodiments, the inner nozzle 15 is coupled to mounting bracket 35 via the inner mount 75 and the outer mount 85. The outer nozzle 30 is coupled to the first mechanism (joint) 50 and the second mechanism (joint) 55. The mounting bracket 35 positions the inner nozzle 15 around the exhaust 20 of the gas turbine 25 when the thrust vectoring exhaust nozzle apparatus 10 is mounted, as shown in FIG. 2B. The inner nozzle 15 is coupled to the outer nozzle 30 via a nozzle bracket 250. The nozzle bracket 250 connects the inner nozzle 15 to the outer nozzle 30 enabling movement of the outer nozzle 30 relative to the inner nozzle 15, as shown in FIG. 3B. The inner nozzle 15 is swivelly coupled to the mounting bracket 35 enabling movement of the inner nozzle 15 relative to the mounting bracket 35 without the mounting bracket 35 moving. The outer nozzle 30 includes a first arm 255 removably affixed to the first joint 50 and a second arm 260 removably affixed to the second joint 55. In some embodiments, the distance between the first arm 225 and the second arm 260 of the outer nozzle 30 corresponds to the distance between the first joint 50 and the second joint 55.

In embodiments, the inner nozzle 15 includes a first shaft 265 disposed adjacent a perimeter edge of the first end 52 of the inner nozzle 15 and a second shaft 270 disposed adjacent a perimeter edge of the first end 52 of the inner nozzle 15. The first shaft 265 extends outwardly relative to the body of the inner nozzle 15. The second shaft 270 extends outwardly relative to the body of the inner nozzle 15. The first shaft 265 and the second shaft 270 are disposed on opposite sides of the body of the inner nozzle 15. In one embodiment, the first shaft 265 and the second shaft 270 extend perpendicularly outwardly relative to the body of the inner nozzle 15. The recess 185 of the outer mount 85 removably receives the first shaft 265 of the inner nozzle 15 via the ball bearing 190. The recess 240 of the inner mount 75 removably receives the second shaft 270 via the ball bearing 245. The ball bearings 190, 245 enable one DOF rotational motion of the inner nozzle 15 relative to the exhaust 20 of the gas turbine 25.

In embodiments, the outer nozzle 30 includes a first shaft 275 disposed on the first arm 255 and a second shaft 280 disposed on the second arm 260, as shown in FIG. 1B. The first shaft 275 extends upwardly relative to the first arm 255 of the outer nozzle 30. The second shaft 280 extends upwardly relative to the second arm 260 of the outer nozzle 30. In one embodiment, the first shaft 275 and the second shaft 280 extend perpendicularly upwardly relative to the first arm 255 and the second arm 260.

The first joint 50 comprises an aperture (not shown) disposed at a distal end 285 thereof that removably receives the first shaft 275 of the outer nozzle 30. The second joint 55 comprises an aperture (not shown) disposed at a distal end 290 thereof that removably receives the second shaft 280. In some embodiments, the distance between a center of the first shaft 275 and a center of the second shaft 280 corresponds to a distance between the center of the aperture of the first joint 50 and the center of the aperture of the second joint 55.

In some embodiments, the first end 65 of the outer nozzle 30 comprises a perimeter edge including a first recess 295 corresponding to the first shaft 265 of the inner nozzle 15 and a second recess 300 corresponding to the second shaft 270 of the inner nozzle 15. The first recess 295 and the second recess 300 enable the inner nozzle 15 to rotate relative to the outer nozzle 30, without interference by the outer nozzle 30.

In embodiments, the outer nozzle 30 includes a third shaft 305 disposed adjacent the perimeter edge of the first end 65 of the outer nozzle 30 and a fourth shaft 310 disposed adjacent a perimeter edge of the first end 65 of the outer nozzle 30, as shown in FIG. 3B. The third shaft 305 extends outwardly relative to the body of the outer nozzle 30. The fourth shaft 310 extends outwardly relative to the body of the outer nozzle. In one embodiment, the third shaft 305 and the fourth shaft 310 extend perpendicularly outwardly relative to the body of the outer nozzle 30. The third shaft 305 and the fourth shaft 310 are disposed on opposites sides of the first end 65 of the outer nozzle 30.

In some embodiments, the nozzle bracket 250 includes a first recess 315 that removably receives the third shaft 305 of the outer nozzle 30 via a ball bearing 320 and a second recess 325 that removably receives the fourth shaft 310 of the outer nozzle 30 via a ball bearing 330. The ball bearings 320, 330 enable one DOF rotational motion of outer nozzle 30 relative to the inner nozzle 15.

Figure 4A:
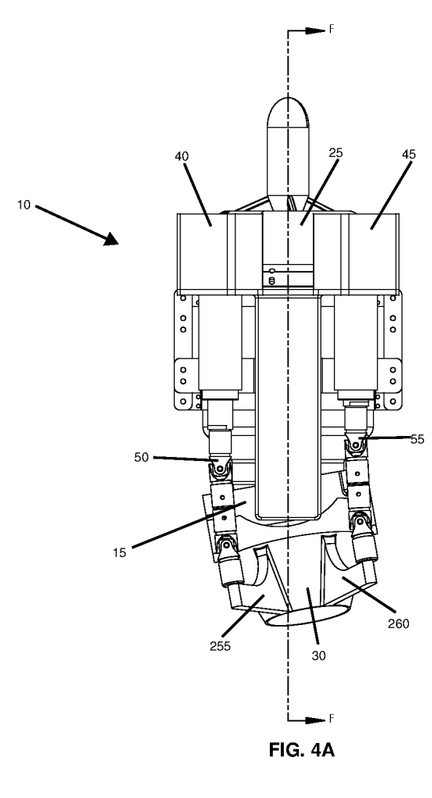
FIG. 4A shows a front view of the thrust vectoring exhaust nozzle mounted onto a gas turbine according to one embodiment of the present disclosed technology.
Figure 4B:
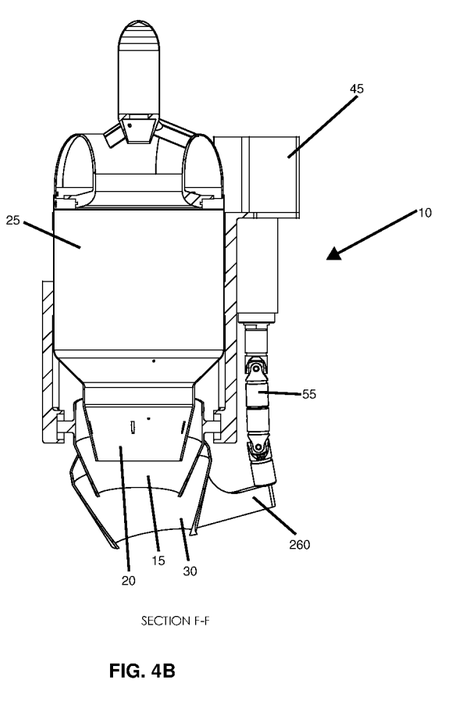
FIG. 4B shows a cross-sectional view of FIG. 4A along line F-F.
Figure 5A:
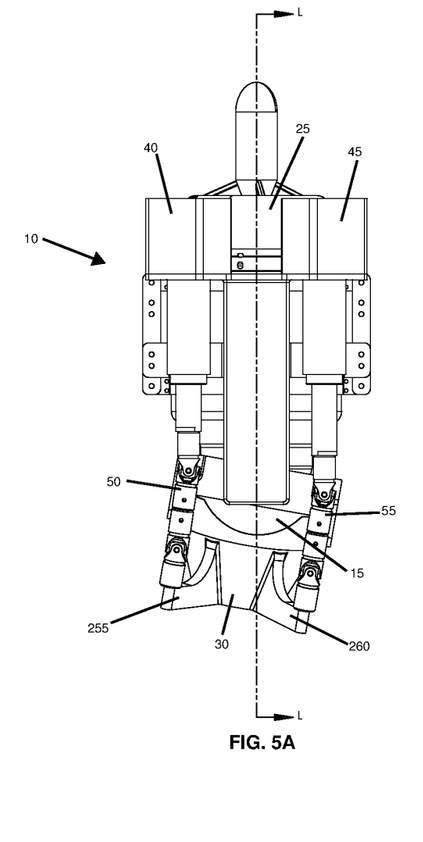
FIG. 5A shows a front view of the thrust vectoring exhaust nozzle mounted onto a gas turbine according to one embodiment of the present disclosed technology.
Figure 5B:
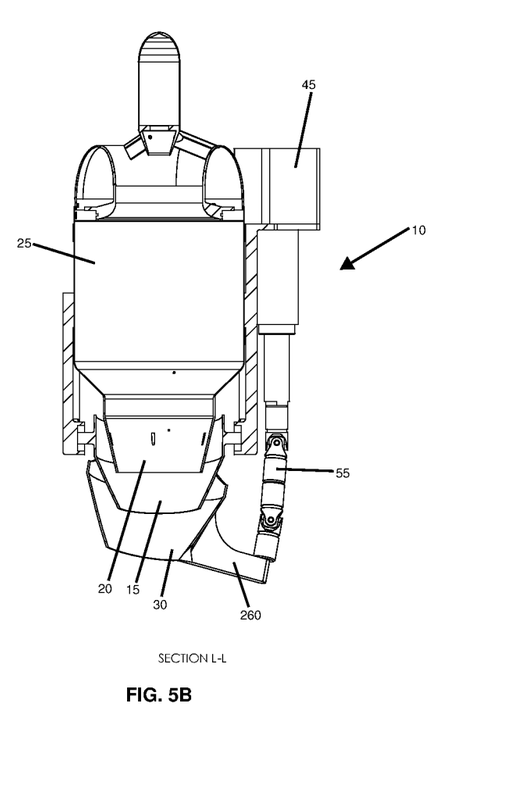
FIG. 5B shows a cross-sectional view of FIG. 5A along line L-L.

Referring now to FIGS. 4A-5B, simultaneously, FIG. 4A shows a front view of the thrust vectoring exhaust nozzle mounted onto a gas turbine according to one embodiment of the present disclosed technology. FIG. 4B shows a cross-sectional view of FIG. 4A along line F-F. FIG. 5A shows a front view of the thrust vectoring exhaust nozzle mounted onto a gas turbine according to one embodiment of the present disclosed technology. FIG. 5B shows a cross-sectional view of FIG. 5A along line L-L. In operation of the thrust vectoring exhaust nozzle apparatus 10, actuation of the first linear actuator 40 and the second linear actuator 45 drives the first joint 50 and the second joint 55, respectively, linearly and asynchronously relative to each other. In other words, the first linear actuator 40 and the second linear actuator 45 drive the first joint 50 and second joint 55, respectively, in a reciprocating motion, such that when the first joint 50 is driven upward, the second joint 55 is being driven upward independently or as a result of movement of the other joint. Hence, the first joint 50 and the second joint 55 are being driven in opposite motions or opposite strokes, in some embodiments, or move independently of one another in other embodiments.

The linear asynchronous motion of the first end 120 of the first joint 50 and the first end 130 of the second joint 55 is converted to rotational motion which rotates the inner nozzle 15 and the outer nozzle 30 about the exhaust 20 in a horizontal direction and vertical direction simultaneously. The first joint 50 and the second joint 55 drive the first arm 255 and the second arm 260, which in turn rotates the outer nozzle 30, which in turn rotates the inner nozzle 15. The simultaneous rotation of the inner nozzle 15 and the outer nozzle 30 in a horizontal and/or vertical direction (that is, perpendicular to each other) which enables thrust vectoring and multidirectional control of an aircraft having the thrust vectoring exhaust nozzle apparatus 10 mounted thereon. All such references to horizontal and vertical direction are relative to one another and are perpendicular or substantially perpendicular to one another.

Rotation of the inner nozzle 15 about the exhaust 20 enables changing of a first degree-of-freedom of exhaust gas emanating from the exhaust 20. Rotation of the outer nozzle 30 about the inner nozzle 15 enables changing of a second degree-of-freedom of exhaust gas emanating from the exhaust 20. When the first joint 50 and the second joint 55 comprise double universal joints, the double universal joints allow rotational motion of the outer nozzle 30 and the inner nozzle 15 relative to the exhaust 20, thereby enabling first degree-of-freedom and second degree-of-freedom of exhaust gas and significant thrust vectoring.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A thrust vectoring exhaust nozzle apparatus, comprising:
    an inner nozzle to change a direction of exhaust gas emanating from an exhaust of a gas turbine along a first degree-of-freedom; and
    an outer nozzle to change the direction of the exhaust gas emanating from the exhaust of the gas turbine along a second degree-of-freedom;
    a mounting bracket removably attachable to the gas turbine;
    a first linear actuator coupled to the mounting bracket;
    a second linear actuator coupled to the mounting bracket;
    a first double universal joint coupled to the first linear actuator; and
    a second double universal joint coupled to the second linear actuator;
    wherein:
    the inner nozzle is disposed within the outer nozzle;
    the inner nozzle, the outer nozzle, and the exhaust of the gas turbine are coaxially aligned relative to one another in a neutral position;
    the outer nozzle is coupled to the first double universal joint and the second double universal joint;
    the inner nozzle is coupled to the mounting bracket;
    the mounting bracket positions the inner nozzle around the exhaust of the gas turbine when mounted;
    actuation of the first linear actuator and the second linear actuator drives the first double universal joint and the second double universal joint linearly at a proximal end of each of the first double universal joint and the second universal joint and independently relative to each other; and
    a general motion of the first double universal joint and the second double universal joint rotates the outer nozzle and the inner nozzle about the exhaust in a horizontal direction and vertical direction simultaneously.

2. The thrust vectoring exhaust nozzle apparatus of claim 1, further comprising a nozzle bracket connecting the inner nozzle to the outer nozzle enabling movement of the outer nozzle relative to the inner nozzle.

3. The thrust vectoring exhaust nozzle apparatus of claim 1, wherein:
    the inner nozzle is swivelly coupled to the mounting bracket enabling movement of the inner nozzle relative to the mounting bracket;
    the outer nozzle comprises a first arm removably affixed to the first double universal joint and a second arm removably affixed to the second double universal joint.

4. The thrust vectoring exhaust nozzle apparatus of claim 3, wherein a distance between the first arm and the second arm of the outer nozzle corresponds to a distance between the first double universal joint and the second double universal joint.

5. The thrust vectoring exhaust nozzle apparatus of claim 1, wherein the inner nozzle comprises a conically shaped body including a first end and a second end, the body comprising a bore extending longitudinally through the body that tapers in diameter from the first end to the second end.

6. The thrust vectoring exhaust nozzle apparatus of claim 1, wherein the outer nozzle comprises a conically shaped body including a first end and a second end, the body of the outer nozzle comprising a bore extending longitudinally through the body that tapers in diameter from the first end to the second end.

7. The thrust vectoring exhaust nozzle apparatus of claim 1, wherein the mounting bracket comprises:
    an inner mount removably attachable to a first side of the gas turbine;
    an outer mount removably attachable to a second side of the gas turbine; and
    a mounting strap removably attachable to the gas turbine;
    wherein the inner mount and the outer mount are removably attachable to each other about the gas turbine via the mounting strap.

8. The thrust vectoring exhaust nozzle apparatus of claim 7, wherein the mounting bracket further comprises a reinforcement plate removably attachable to the first side of the gas turbine to support the inner mount when mounted on the gas turbine.

9. The thrust vectoring exhaust nozzle apparatus of claim 7, wherein the first linear actuator and the second linear actuator each comprises a body including an actuating mechanism coupled to a shaft, wherein the actuating mechanism drives the shaft linearly back and forth at various rates.

10. The thrust vectoring exhaust nozzle apparatus of claim 9, wherein:
    the first double universal joint comprises a first end removably affixed to a distal end of the shaft of the first linear actuator; and
    the second double universal joint comprises a first end removably affixed to a distal end of the shaft of the second linear actuator.

11. The thrust vectoring exhaust nozzle apparatus of claim 9, wherein the outer mount comprises:
    a first elongated body including a first end, a second end, a first side, and a second side;
    a pair of first arcuate arms including an arch corresponding to a curvature of a body of the gas turbine to fit flush around the gas turbine;
    a linear actuator mount including a first aperture for receiving the shaft of the first linear actuator therethrough and a second aperture for receiving the shaft of the second linear actuator therethrough; and
    a first recess to receive and retain a first ball bearing therein.

12. The thrust vectoring exhaust nozzle apparatus of claim 11, wherein:
    the pair of first arcuate arms extend outwardly from the first side of the first elongated body and further comprises an aperture for fastening the first elongated body to the gas turbine; the linear actuator mount comprises a plate including the first aperture and the second aperture, the plate disposed on a first end of the linear actuator mount and extending outwardly from a second side of the linear actuator mount; and the first recess is disposed on the second side of the first elongated body.

13. The thrust vectoring exhaust nozzle apparatus of claim 11, wherein the inner mount comprises:
    a second elongated body including a first end, a second end, a first side, and a second side;
    a second arcuate arm including an arch corresponding to the curvature of the body of the gas turbine to fit flush around the gas turbine; and
    and a second recess to receive and retain a second ball bearing therein.

14. The thrust vectoring exhaust nozzle apparatus of claim 13, wherein:

the second arcuate arm is disposed on the first end of the second elongated body and extends outwardly from the first side of the second elongated body of the inner mount and further comprises an aperture for fastening the second elongated body of the inner mount to the gas turbine; and the second recess is disposed on the second side of the second elongated body.

15. The thrust vectoring exhaust nozzle apparatus of claim 13, wherein the inner nozzle further comprises:
a first shaft disposed adjacent a perimeter edge of the first end of the second elongated body, the first shaft extending outwardly relative to a body of the inner nozzle;
a second shaft disposed adjacent a perimeter edge of the first end of the inner nozzle, the second shaft extending outwardly relative to the body of the inner nozzle; wherein:
the first shaft and the second shaft are disposed oppositely relative to each other on a first end of the inner nozzle;
the first recess of the outer mount removably receives the first shaft via the first ball bearing; and
the second recess of the inner mount removably receives the second shaft via the second ball bearing;
the first ball bearing and the second ball bearing enable horizontal and vertical movement of the inner nozzle relative to the exhaust of the gas turbine.

16. The thrust vectoring exhaust nozzle apparatus of claim 15, wherein:
the outer nozzle further comprises:
a first shaft disposed on a first arm of the outer nozzle, the first shaft extending upwardly relative to the first arm of the outer nozzle; and
a second shaft disposed on a second arm of the outer nozzle, the second shaft extending upwardly relative to the second arm of the outer nozzle;
the first double universal joint comprises an aperture disposed at a distal end thereof that removably receives the first shaft; and
the second double universal joint comprises an aperture disposed at a distal end thereof that removably receives the second shaft;
wherein a distance between a center of the first shaft and a center of the second shaft corresponds to a distance between the center of the aperture of the first double universal joint and the center of the aperture of the second double universal joint.

17. The thrust vectoring exhaust nozzle apparatus of claim 16, wherein a first end of the outer nozzle comprises a perimeter edge including a first recess corresponding to the first shaft of the inner nozzle and a second recess corresponding to the second shaft of the inner nozzle, wherein the first recess and the second recess provide clearance for one degree-of-freedom rotational motion of the inner nozzle relative to the outer nozzle.

18. The thrust vectoring exhaust nozzle apparatus of claim 17, wherein the outer nozzle further comprises:
a third shaft disposed adjacent the perimeter edge of the first end of the outer nozzle, the third shaft extending outwardly relative to a body of the outer nozzle; and
a fourth shaft disposed adjacent a perimeter edge of the first end of the outer nozzle, the fourth shaft extending outwardly relative to the body of the outer nozzle;
wherein the third shaft and the fourth shaft are disposed oppositely relative to each other on the first end of the outer nozzle.

19. The thrust vectoring exhaust nozzle apparatus of claim 18, further comprising a nozzle bracket comprising:
a first recess that removably receives the third shaft of the outer nozzle via a third ball bearing; and
a second recess that removably receives the fourth shaft of the outer nozzle via a fourth ball bearing;
wherein the third and the fourth ball bearings enable one degree-of-freedom rotational motion of the outer nozzle relative to the inner nozzle.

* * * * *